(12) United States Patent
Busam et al.

(10) Patent No.: US 7,252,411 B2
(45) Date of Patent: Aug. 7, 2007

(54) DEVICE FOR DEPICTING A LINEAR OPTICAL MARKING

(75) Inventors: Daniel Busam, Godramstein (DE); Gabriel Kallabis, Spirkelbach (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 221 days.

(21) Appl. No.: 11/081,816

(22) Filed: Mar. 17, 2005

(65) Prior Publication Data
US 2005/0237748 A1 Oct. 27, 2005

(30) Foreign Application Priority Data
Mar. 26, 2004 (DE) .................... 10 2004 015 469
May 10, 2004 (DE) ................. 20 2004 007 476 U

(51) Int. Cl.
*F21V 5/00* (2006.01)
(52) U.S. Cl. ................. 362/327; 362/147; 362/259; 33/290; 359/731
(58) Field of Classification Search ........ 362/147, 362/259, 327; 33/286, 290; 359/731
See application file for complete search history.

(56) References Cited

U.S. PATENT DOCUMENTS

| | | | |
|---|---|---|---|
| 3,984,154 A | 10/1976 | Chin et al. | |
| 4,799,753 A | 1/1989 | Breitbarth et al. | |
| 6,539,638 B1 | 4/2003 | Pelletier | |
| 6,694,629 B2 * | 2/2004 | Goodrich | 33/286 |
| 2002/0178595 A1 | 12/2002 | Tamamura | |
| 2003/0159299 A1 | 8/2003 | Goodrich | |
| 2004/0051974 A1 | 3/2004 | Nishimura | |

* cited by examiner

*Primary Examiner*—Stephen F Husar
(74) *Attorney, Agent, or Firm*—Dennison, Schultz & MacDonald

(57) ABSTRACT

A device for depicting a linear optical marking (36, 38) in a room, including a housing (11) with a light source (16, 18) that emits the light along an optical axis (15, 17), as well as a lens (28, 30) that both reflects the light and allows it to pass through, that is arranged in front of the light source and through which the optical axis extends. In order to be able to illuminate an area of the room with simple design measures, i.e. depict lines, which cannot be captured with a direct beam path of the light source it is suggested that the lens (28, 30) have a trough-shaped geometry with a longitudinal axis that extends transversely to the optical axis (15, 17) of the light source (16, 18), that the lens have a first section extending on the light source side, and that the first section reflect light in the direction of the light source all the way into an area that extends beneath, to the side of, or above the light source as a function of the course of the longitudinal axis to the lens and into the area of the room facing away from the light source in terms of the light source.

12 Claims, 3 Drawing Sheets

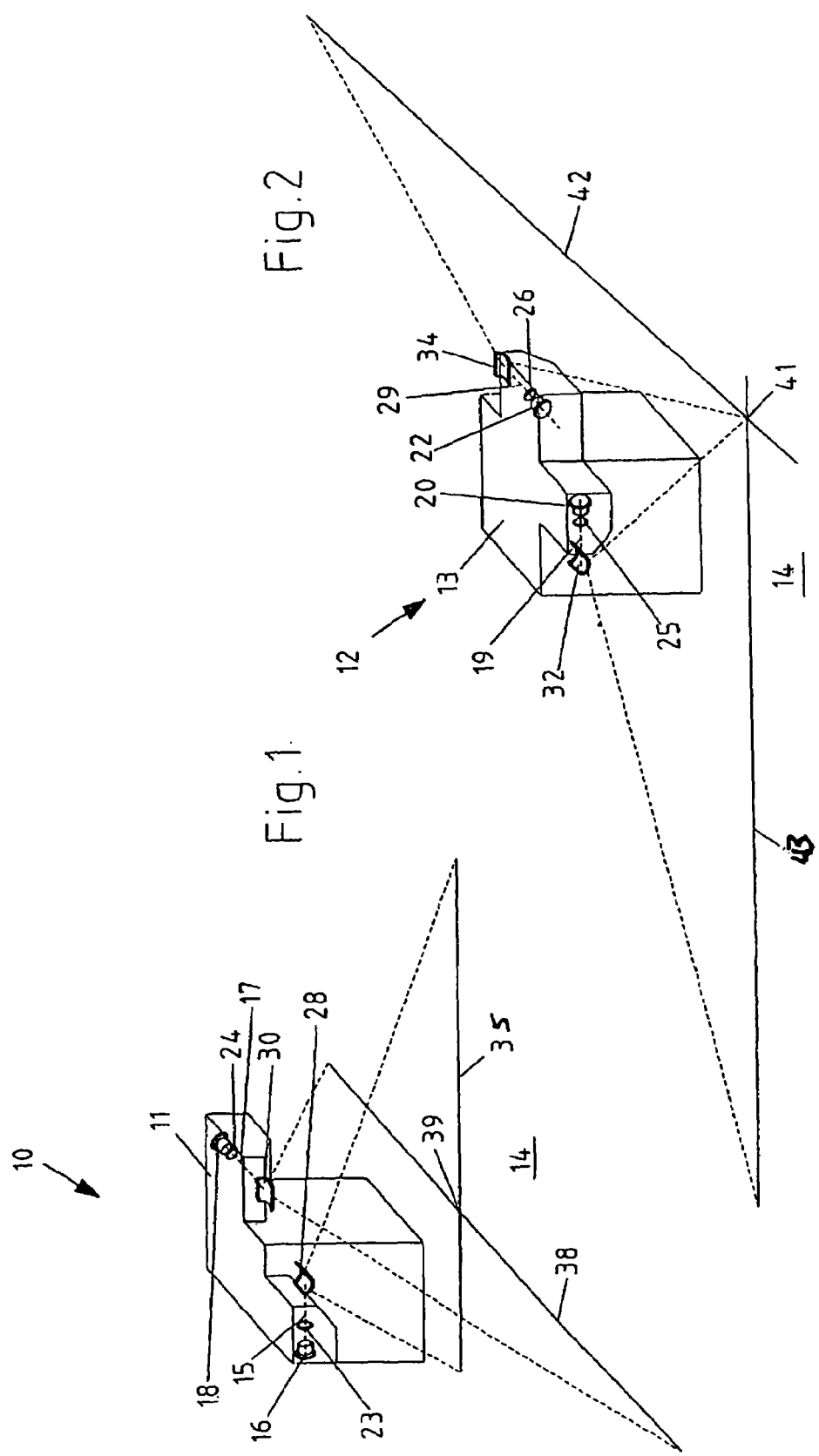

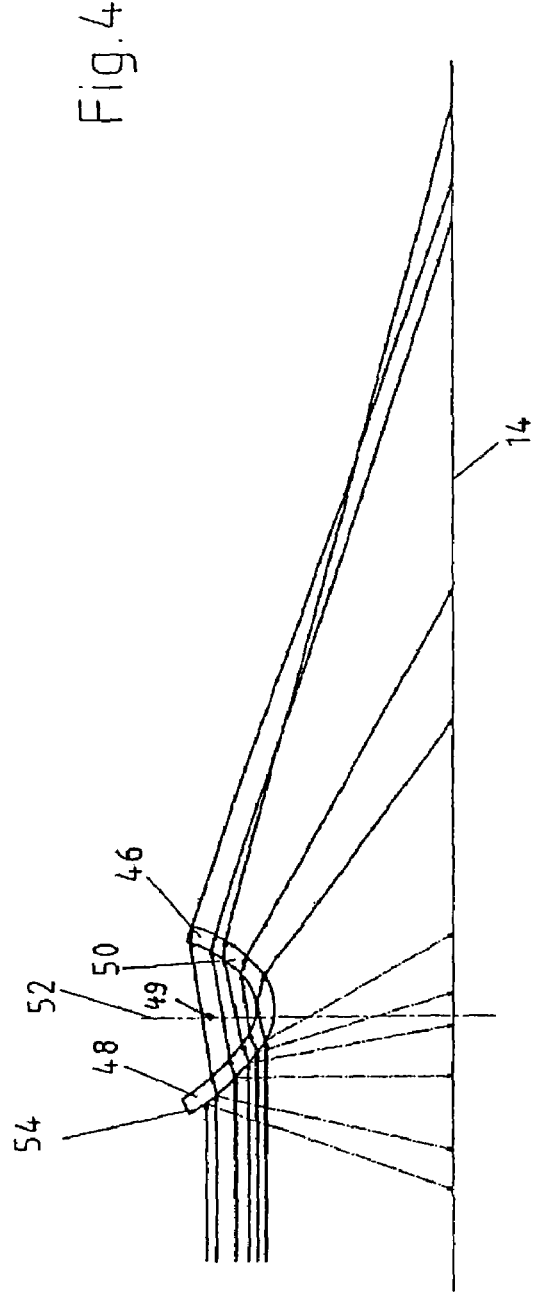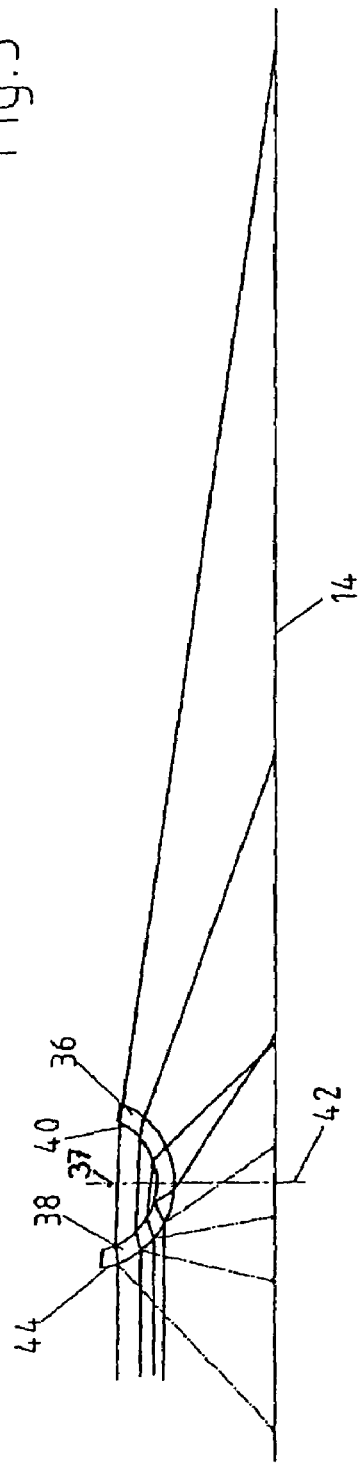

DEVICE FOR DEPICTING A LINEAR OPTICAL MARKING

BACKGROUND OF THE INVENTION

The invention relates to a device for depicting a linear optical marking in a room, comprising a housing with a light source that emits the light along an optical axis and a lens that both reflects the light and allows it to pass, that is arranged in front of the light source and through which the optical axis extends.

A corresponding device that utilizes a laser beam is disclosed in DE-A-102 17 108. In order to generate a line extending without interruption across a wide angle using the laser beam device, which is used in particular in the construction industry, it is provided that a laser beam bundle that penetrates a collimator lens shines on a rod lens, which comprises a semitransparent surface on the light source side in order to reflect a linear light beam in the direction of the light source. The non-reflected light then penetrates a completely transparent surface of the rod lens that is facing away from the light source, and is refracted in order to generate a linear light beam in a second direction that is opposite from the first direction.

In order to depict a line of visible light on a surface, starting directly in front of a housing that accommodates the light source, according to U.S. Pat. No. 6,502,319 several cylindrical lenses or mirrors are provided, by means of which the light beam emitted by the light source is distributed as needed.

Light beam leveling instruments pursuant to DE-U-203 04 117 and DE-U-203 04 114 comprise line lenses, which are composed of sections having different focal distances, in front of a light source via which a linear light beam is supposed to be created.

In order to generate two lines that intersect at a right angle on a work piece beneath an optical marking device according to DE-C-199 53 114 two lateral projection devices that are arranged next to each other are suggested, which each comprise a light source and an optical unit arranged in its optical path.

In order to generate an optical marking line spanning roughly 360° pursuant to U.S. Pat. No. 6,539,638 a partially transparent lens in the form of a cylinder is used.

From DE-C-36 04 500 we know of a terminal for a light conductor for dental applications. The light conductor is used to evenly illuminate a rectangular field. For this purpose a cylindrical lens is used, which comprises a trough-shaped recess.

Pursuant to US-A-2003/01 59 299 intersecting lines are depicted on a surface by means of lens arrangements.

SUMMARY OF THE INVENTION

It is the object of the present invention to further develop a device of the above-mentioned kind such that an area that cannot be captured via a direct optical path of the light source can be optically illuminated with simple design measures, i.e. that lines can be depicted.

To achieve this object the invention essentially provides that the lens has a trough-shaped geometry with a longitudinal axis extending transversely to the optical axis of the light source, that the lens comprises a first section extending on the light source side and that the first section reflects light in the direction of the light source up to an area that extends beneath, to the side of, and/or above the light source as a function of the course of the longitudinal axis of the lens and all the way into the area of the room facing away from the light source in terms of the light source.

Pursuant to the invention the roughly linear light beam is distributed by means of the lens due to the radiation characteristic of the light source such that a reflection of the light to behind the light source occurs, so that especially also the area of the base from which the device extends can be optically marked in an area that cannot be captured by means of a light beam extending directly from the light source, i.e. for example on the base the area that extends in vertical projection of the light source in the direction of the base. Corresponding depictions can also be generated to the side of and above the light source.

For the implementation a geometrically simple lens that is inexpensive to manufacture is used, namely in the simplest case a trough-shaped longitudinal section of a glass body having a hollow cylinder geometry, which on one hand reflects light into the area beneath, to the side of or above the light source as a function of the alignment of the lens to the light source and on the other hand allows light to pass through to such an extent that a desired line can be depicted in the usual fashion in front of the light source and can hence be used for measurement purposes, especially in the construction field.

In particular it is provided that the first section or leg outlining a bend in its cross-section and the second section or leg likewise outlining a bend in its cross-section each run on one side of a plane that extends perpendicular to the optical axis of the light source and that the first section running on the light source side is preferably longer than the second section. Through the design measures taken in this respect the light is reflected and refracted with the desired intensity to the desired extent.

In order to achieve adequate projection or depiction of the linear light beam, it is provided that the trough-shaped longitudinal section is a section of a tube having a circular or elliptic geometry in its cross-section. The trough-shaped section can also have a cross-section that corresponds to a section of a parabola.

Apart from this it is in particular provided that at least the first section extending on the lens side is composed of two sections with bending radii that deviate from each other. Preferably both the first section and the second section are composed of sections with different bending radii, respectively.

Furthermore there is the possibility that the lens has no constant wall thickness, but rather varies in its thickness in areas in order to achieve the desired optical characteristics.

In order to depict a marking generated by intersecting lines it is provided that in the housing at least two light sources with lenses arranged in front of them are arranged, the longitudinal axes of which extend in a common plane or in planes arranged parallel to each other and preferably at a right angle to each other. This way it is especially possible to depict a cross directly beneath the housing, i.e. the base.

BRIEF DESCRIPTION OF THE DRAWINGS

Further details, benefits and features of the invention result not only from the claims, the features revealed in them—either alone and/or in combination—, but also from the following description of preferred exemplary embodiments illustrated in the drawing.

Shown are:

FIG. 1 a first embodiment of a device used to generate linear optical markings,

FIG. 2 a second embodiment of a device used to generate linear optical markings, FIG. 3 a first embodiment of a lens, FIG. 4 a second embodiment of a lens, and FIG. 5 another embodiment of a device used to generate a linear optical marking.

DESCRIPTION OF THE PREFERRED EMBODIMENTS

Figure 5:
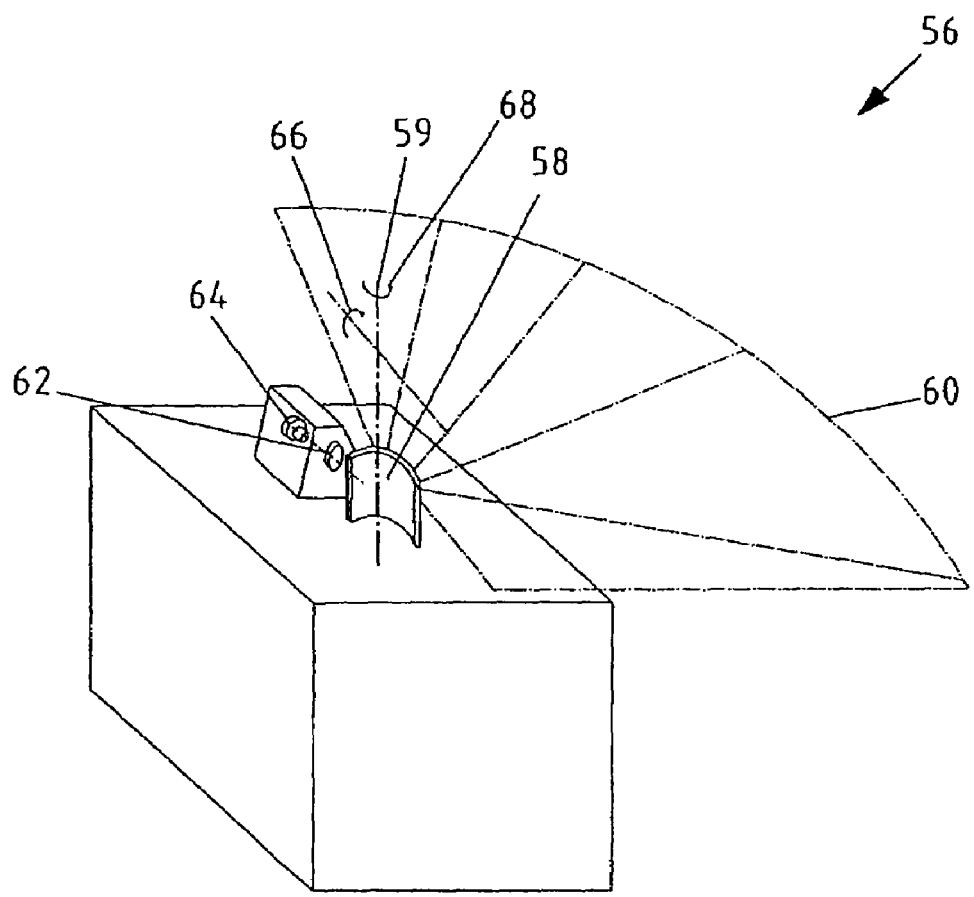

In order to depict vertical and horizontal lines on surfaces especially in the construction industry, the process of using so-called laser marking or leveling instruments is known. Here usually laser diodes are used, the emitting light of which is bundled in a linear fashion by means of an optical unit in order to then generate marking lines in the desired fashion.

FIGS. 1 and 2 basically show a marking device 10 or 12, which is arranged on a base 14. In the exemplary embodiment, in each housing 11, 13 of a device 10, 12 two laser diodes 16, 18, 20, 22 are arranged, which are assigned in the usual fashion an optical unit 23, 24, 25, 26 comprising a collimator lens. This way, the light coming from the laser diode 16, 18, 20, 22 is focused in a linear fashion, then shines on additional lenses 28, 30, 32, 34, by means of which the beam is distributed such that optical lines 35, 38, 43, 42 are depicted in the desired extent on the base or floor surface 14. The optical units 23, 24, 25, 26 or lenses 28, 30, 32, 34 can also be. Designed such that not only optical lines are depicted on the floor surface 14, but also on the adjoining walls of a room.

In order to depict markings also directly beneath the optical units 23, 24, 25, 25 or laser diodes 16, 18, 20, 22, i.e. in an area that is cut by the vertical projection of the laser diodes 16, 18, 20, 22, the lenses 28, 30, 32, 34 have a trough-shaped geometry with longitudinal axes extending along and preferably parallel to the base 14, said axes both reflecting and refracting the light coming from the optical unit 23, 24, 25, and hence depicting it in the usual fashion. This principle will be explained more closely based on FIGS. 3 and 4.

In the exemplary embodiment in FIG. 3 a lens 36 is shown in a cross-sectional view, having the geometry of a trough as the longitudinal section of a hollow cylinder and being transparent. The longitudinal axis 37 of the lens 36 runs perpendicular to the drawing plane. The lens 36 is composed of a first section 38 or leg on the light source side and a second section 40 or leg facing away from the light source, wherein the first section 38 is longer than the second section 40, when viewed along a plane 42 that runs perpendicular to the base or floor surface 14. The first and second sections 38, 40 have the geometry of a circular section in the cross-sectional view.

A portion of the beams shining on the lens 36 is reflected on the outer surface 44 of the first section 38 facing the light source to such an extent that a linear light beam extends in an area that runs beneath the laser diodes 16, 18, 20, 22 or the optical unit 23, 24, 25 arranged directly thereafter and comprising the collimator lens. The light beam portion that penetrates the first section 38 is then refracted in the usual fashion by the second section 40 in order to depict a linear optical marking on the base or floor surface 14 in front of the lens 36, i.e. in the area away from the laser diode 16, 18, 20, 22, as is symbolized by the beams of light illustrated in FIG. 3.

A lens 46 shown in FIG. 4 having likewise a trough-shaped geometry also comprises a first section 48 extending likewise on the light source side and a second section 50 arranged away from the light source side in order to fulfill the optical functions that have been explained in reference to the lens 36. Deviating from the exemplary embodiment in FIG. 3, however, the lens 46 does not have the geometry of a hollow cylinder longitudinal section, but in its cross-sectional view has the geometry of an elliptic or parabolic section. Here the first section 48 is also longer than the second section 50, viewed in relation to a plane 52 extending perpendicular to the base or floor surface 14. The longitudinal axis 49 of the lens 46 penetrates the drawing plane.

In order to be able to optically depict a line directly beneath the light source or the optical element arranged directly thereafter, a portion of the beams coming from the light source is reflected, specifically on the outer surface 54 of the first section 48 facing the light source. The remaining portion of beams is refracted in order to depict a line in the desired fashion in front of the optical unit on the base 14.

The first and second sections 38, 40 or 48, 50 can be composed of sections having different bending radii, respectively, and/or the first section as a unit can overall have a first bending radius and the second section a second bending radius, wherein the bending radii in turn are different.

If the lenses 36, 46 are preferably transparent, then partial transparency can also be provided to the desired extent in order to be able to adjust the intensity levels of the beam depicted on the base 14 as desired.

FIGS. 1 and 2 additionally show that the light sources 16, 18, 20, 22 arranged in the housing 11 or 13, i.e. their optical axes 15, 17 or 19, 29, are aligned such to each other that the lines 35, 38, 43, 42 depicted on the base 14 by the lenses 28, 30, 32, 34 arranged upstream and having a trough-shaped geometry intersect in a point 39, 41, preferably at a right angle.

FIG. 5 reveals another embodiment of a marking device 56, by means of which a linear optical marking can be projected on an object such as the wall of a room. Deviating from the embodiments in FIGS. 1 and 2, the longitudinal axis 59 of a lens 58 having likewise a trough-shaped geometry runs vertically so that consequently perpendicular thereto, i.e. horizontally, a corresponding marking 60 can be depicted. For this it is of course required that [on the lens 58-sic] a corresponding light beam 62, which is emitted by a laser diode 64, shines on the lens 58 so as to generate the marking 60 extending both in front of and laterally behind the laser diode 64 in accordance with the explanations for FIGS. 1 to 4.

The explanations of FIG. 5 and/or a comparison with the examples in FIGS. 1 to 4 show that the linear optical marking 60 can be aligned with an object as a function of the alignment of the longitudinal axis 59 of the lens 58.

In order to enable different projection directions, the lens 58 can be designed such that it can rotate around an axis extending perpendicular to the longitudinal axis 59 of the lens 58 (arrow 66). It is also possible to rotate the lens 58 around the longitudinal axis 59 (arrow 68) in order to be able to adjust the extension of the optical marking.

What is claimed is:

1. Device for depicting a linear optical marking in a room, comprising a housing with a light source emitting the light along an optical axis and a lens having a trough shaped geometry that both reflects the light and allows it to pass, the lens being arranged in front of the light source and through which the optical axis extends, the lens having a longitudinal axis transverse to the optical axis of the light source, the lens having a first section extending on the light source side with an outer surface upon which light emitted by the light source impinges and is linearly focused via an optical unit, the outer surface of the first section reflecting light in a direction of the light source all the way into an area that extends beneath, to the side of or above the light source as a function of the course of the longitudinal axis to the lens and into the area of the room that faces away from the light source in terms of the light source, the light passing through first section impinging on a second section of the lens facing away from the light source and which is refractive for generating a linear optical marking in an area of the room distal to the light source.

2. Device pursuant to claim 1, wherein the housing is assigned a base and the longitudinal axis of the lens extends along the base and light is reflected via the outer surface of the first section onto the base in an area, which in relation to the base coincides with an area extending directly beneath the light source.

3. Device pursuant to claim 1, wherein the first and second sections each run on one side of a plane that extends perpendicular to the optical axis of the light source and have different lengths.

4. Device pursuant to claim 1, wherein the first and second sections each run on one side of a plane that extends perpendicular to the optical axis of the light source and have the same lengths.

5. Device pursuant to claim 3, wherein the first section of the lens is longer than the second section.

6. Device pursuant to claim 1, wherein the trough-shaped geometry is a longitudinal section of a tube having a circular or elliptic geometry in its cross-section.

7. Device pursuant to claim 1, wherein the trough-shaped geometry is a cross-section that corresponds to a section of a parabola.

8. Device pursuant to claim 1, wherein at least the first section of the lens comprises sections with bending radii that deviate from each other.

9. Device pursuant to claim 3, wherein both the first section and the second section of the lens comprises sections with bending radii that deviate from each other.

10. Device pursuant to claim 3, wherein the first section has a first bending radius and the second section has a second bending radius, and the first bending radius deviates from the second bending radius.

11. Device pursuant to claim 1, wherein the lens comprises areas with different wall thickness levels.

12. Device pursuant to claim 4, wherein the first section has a first bending radius and the second section has a second bending radius, and the first bending radius deviates from the second bending radius.

* * * * *